US012500741B2

(12) United States Patent
Livshits et al.

(10) Patent No.: US 12,500,741 B2
(45) Date of Patent: Dec. 16, 2025

(54) SYSTEMS AND METHODS FOR SECURELY PROVIDING METADATA FOR DECRYPTING CONTENT HISTORY OF AN ENCRYPTED SESSION

(71) Applicant: RingCentral, Inc., Belmont, CA (US)

(72) Inventors: David Livshits, Modiin-Maccabim-Reut (IL); Lev Rosenblit, Shoham (IL); Dmitrii Bukreev, Petah Tikva (IL); Robert Behar, Hadera (IL)

(73) Assignee: RingCentral, Inc., Belmont, CA (US)

( * ) Notice: Subject to any disclaimer, the term of this patent is extended or adjusted under 35 U.S.C. 154(b) by 74 days.

(21) Appl. No.: 18/611,183

(22) Filed: Mar. 20, 2024

(65) Prior Publication Data
US 2025/0300809 A1    Sep. 25, 2025

(51) Int. Cl.
*H04L 9/08*    (2006.01)
*H04L 9/30*    (2006.01)

(52) U.S. Cl.
CPC ............. *H04L 9/0819* (2013.01); *H04L 9/30* (2013.01)

(58) Field of Classification Search
CPC .................................................. H04L 9/0819
See application file for complete search history.

(56) References Cited

U.S. PATENT DOCUMENTS

| | | |
|---|---|---|
| 10,708,237 B2 | 7/2020 | Lurey et al. |
| 11,616,742 B2 | 3/2023 | Manas et al. |
| 2003/0204734 A1 | 10/2003 | Wheeler |
| 2020/0366479 A1* | 11/2020 | Lee .......... H04L 9/0861 |
| 2022/0217106 A1* | 7/2022 | Manas ................. H04L 63/0428 |
| 2022/0376895 A1 | 11/2022 | Booth et al. |
| 2023/0102966 A1* | 3/2023 | Barnes ................. H04L 9/0866 380/284 |
| 2024/0275590 A1* | 8/2024 | Kesavan ................ H04L 9/088 |

FOREIGN PATENT DOCUMENTS

| | | |
|---|---|---|
| CN | 112804133 A | 5/2021 |
| WO | WO2023049002 A1 | 3/2023 |

* cited by examiner

*Primary Examiner* — Bradley W Holder
(74) *Attorney, Agent, or Firm* — Ansari Katiraei LLP; Arman Katiraei; Sadiq Ansari

(57) ABSTRACT

An end-to-end encrypted communication system securely provides session keys for encrypted session history recovery for new members or reconnecting members of an encrypted session. The encrypted session history recovery adapts the end-to-end encryption for secure distribution of the encrypted content and session keys that were exchanged before the members connected to the encrypted session. The system receives encrypted content from a first member of the encrypted session during a first time when the first member is online and a second member of the encrypted session is offline and not connected to the encrypted session. The system detects that the second member comes online and connects to the encrypted session at a second time, and provides the second member with a session key associated with decrypting the encrypted content that was exchanged prior to the second member connecting to the encrypted session.

20 Claims, 8 Drawing Sheets

SYSTEMS AND METHODS FOR SECURELY PROVIDING METADATA FOR DECRYPTING CONTENT HISTORY OF AN ENCRYPTED SESSION

TECHNICAL FIELD

The present disclosure relates to the field of data privacy and encryption. More specifically, the present disclosure relates to securely exchanging session keys and other metadata that are used to decrypt historical content that was previously exchanged over an encrypted communication session.

BACKGROUND

End-to-end encryption secures data that is exchanged between two or more parties. The two or more parties securely exchange cryptographic keys. A sender may encrypt a message or other content using the securely exchanged cryptographic keys before transmission over a data network, and only receivers that performed the secure cryptographic key exchange with the sender are able to decrypt the encrypted message or other content using the securely exchanged cryptographic keys.

The end-to-end encryption prevents new members that join an encrypted session from receiving the keys needed to decrypt the content that was exchanged prior to the new members joining the encrypted session. The end-to-end encryption also prevents an offline member from reconnecting to an encrypted session and receiving the keys for decrypting any content that was exchanged while the member was offline and before the member rejoins the encrypted session. Storing and transferring the content history without encryption to the new member or the reconnecting offline member creates a vulnerability by which attackers may circumvent the security and privacy afforded by the end-to-end encryption. Accordingly, end-to-end encryption services as currently implemented do not support secure content history recovery.

DETAILED DESCRIPTION OF PREFERRED EMBODIMENTS

Figure 1:
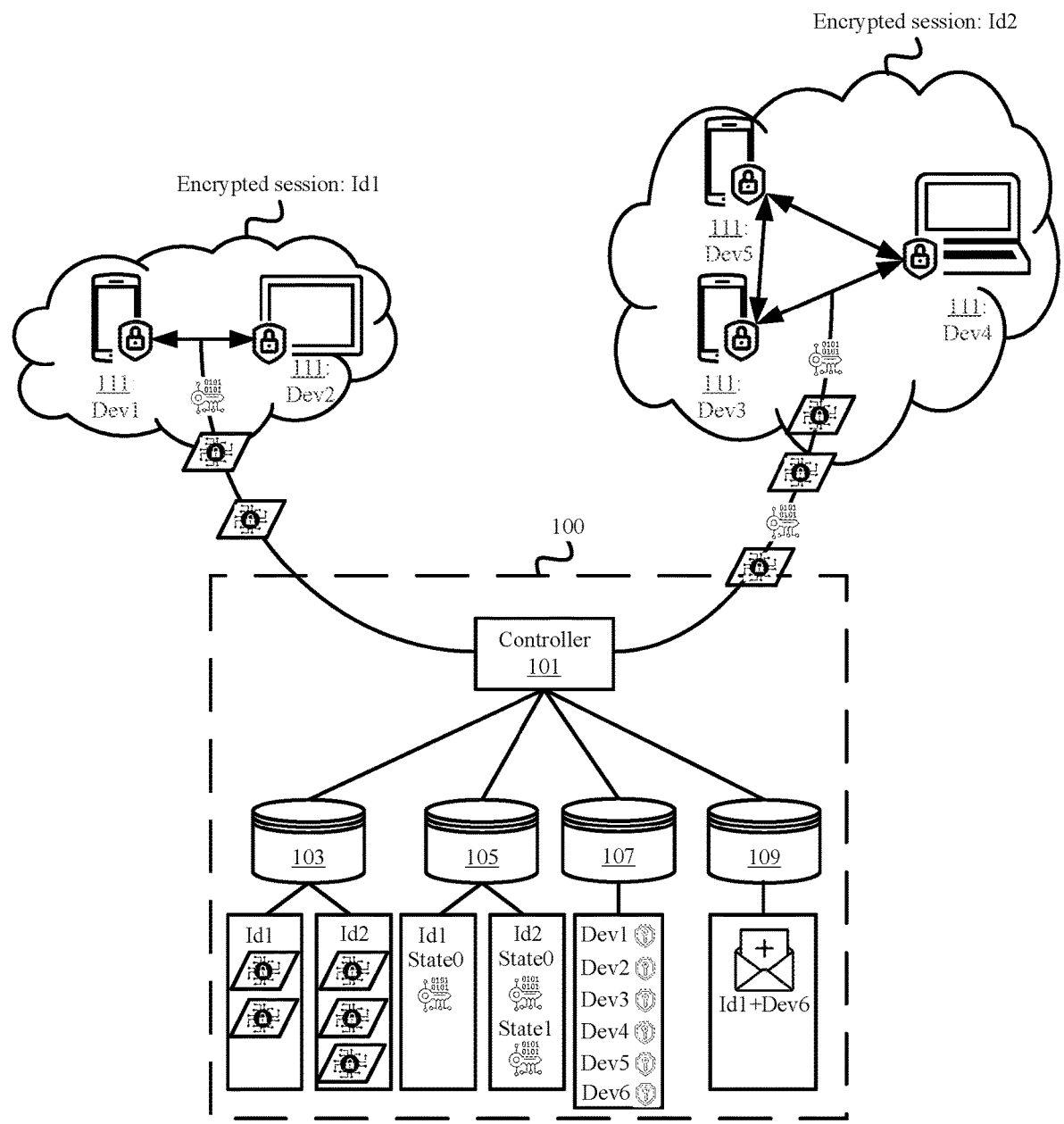
FIG. 1 illustrates an example architecture for an end-to-end encrypted communication system that supports secure content history recovery in accordance with some embodiments presented herein.

This disclosure arises from the realization that end-to-end encryption services as currently implemented do not support or allow for new members or temporarily offline members to connect to an encrypted communication session, receive the encrypted content that was exchanged while the new members or temporarily offline members were not actively connected to the encrypted communication session, and decrypt the previously exchanged encrypted content. Without the content history, the new members or temporarily offline members may be unable to follow a conversation or may not receive important information that was exchanged in the encrypted session. Moreover, the security and privacy of the end-to-end encryption services may be circumvented and vulnerabilities may be created if the content history is shared without encryption or using alternative channels or means.

The current disclosure provides a technological solution to the technological problem of data privacy and encryption. The technological solution improves upon end-to-end encryption services by securely providing session keys and/or other metadata for decrypting encrypted content that was previously exchanged in an encrypted session to an authorized member of the encrypted session that was disconnected or otherwise not actively participating in the encrypted session when the session keys and the encrypted content history was exchanged. The technological solution retains encryption throughout the content history recovery including the distribution of the session keys and the content history to the new or reconnecting authorized member of the encrypted session. Specifically, the session keys and/or other related metadata for the encrypted content history decryption history are provided in one or more recovery messages that are sent contemporaneously with and separate from the encrypted content history to the authorized member. If another party (e.g., a user that is not authorized to access the encrypted session) receives either or both of the recovery messages or the encrypted content history, they will be unable to decrypt the content. Only the authorized members are able to extract and use the session keys from the one or more recovery messages for the decryption of the encrypted content history.

The technological solution enhances security and privacy of end-to-end encryption services, and adapts the end-to-end encryption services for real-time and on-demand applications. For instance, the technological solution enables members of an encrypted session to connect and disconnect from the encrypted session at different times without losing access to the encrypted content that was exchanged while the members are offline or disconnected from the encrypted session.

The technological solution is adapted to work in conjunction with various encryption protocols and/or end-to-end encryption services. An encryption protocol or end-to-end encryption service is one that ensures that only the authorized members in a group or session, and no intermediate servers, routers, devices, relay systems, or other parties, can read and write messages to the group or session. Accordingly, the technological solution may be adapted to enhance the functionality and accessibility of various continuous group key agreement protocols, such as the Messaging Layer Security ("MLS") protocol, and/or other encryption or Secure Group Messaging ("SGM") protocols. The technological solution is agnostic of the underlying encryption protocol that is used to securely exchange the session keys and/or other cipher metadata between clients and/or that are used to perform the encryption and decryption of the session content.

FIG. 1 illustrates an example architecture for an end-to-end encrypted communication system 100 that supports secure content history recovery in accordance with some embodiments presented herein. End-to-end encrypted communication system 100 includes one or more devices or machines with processor, memory, storage, network, and/or other hardware resources that implement controller 101, encrypted content store 103, history tracker 105, directory 107, and invitations store 109.

In some example embodiments, one or more of encrypted content store 103, history tracker 105, directory 107, and invitations store 109 are optional components and may be excluded from end-to-end encrypted communication system 100 depending on the supported secure content history implementation. In some other example embodiments, two or more of encrypted content store 103, history tracker 105, directory 107, and invitations store 109 may be combined as a single data store, repository, or database.

Controller 101 may establish, manage, and/or otherwise facilitate the encrypted sessions through which different sets of two or more client devices 111 securely exchange content with one another using the MLS, SGM, and/or other end-to-end encryption and/or communication protocols. The encrypted sessions and the content exchanged over the encrypted sessions may include encrypted textual content, multimedia content, chat, voice, conferencing, and/or other forms of encrypted communication.

Client devices 111 may register with controller 101 for end-to-end encryption service, and controller 101 may create an encrypted session for the registered client devices 111, manage the addition and removal of members to and from the encrypted session, and/or distribute the session keys and encrypted content between the authorized members of the encrypted session. The encryption and decryption of the content is performed by client devices 111 independent of controller 101 according to the underlying end-to-end encryption protocol used for the end-to-end encryption service.

End-to-end encrypted communication system 100 may include multiple controllers 101 that are distributed to different network locations. Each controller 101 is capable of supporting multiple encrypted sessions for different sets of client devices 111.

Client devices 111 may access the various encryption services of end-to-end encrypted communication system 100 via controller 101. Specifically, when a client device 111 registers with end-to-end encrypted communication system 100 and is added as an authorized member of an encrypted session, that client device 111 becomes an encrypted endpoint of the encrypted session.

As an encrypted endpoint, client device 111 may exchange encrypted content with other encrypted endpoints of the same end-to-end encrypted session or encrypted group without intervening devices or nodes being able to decrypt the encrypted content or otherwise access the decrypted content. The encrypted content may route through controller 101 with controller 101 providing various encrypted session management functionality (e.g., managing member addition and removal for the encrypted session, key exchanges, secure history recovery, etc.). Client devices 111 include user devices that encrypt and decrypt the encrypted session content based on the cryptographic keys and/or cipher data exchanged with other client devices 111 of the same encrypted session using an underlying or supported encryption protocol.

Encrypted content store 103 may store the encrypted content that is exchanged in each encrypted session created, hosted, or managed by controller 101. The encrypted content remains encrypted once stored in encrypted content store 103. In other words, the decrypted content is never stored in encrypted content store 103. Also, the session keys that are used to decrypted the encrypted content are stored elsewhere and not in encrypted content 103 to preserve the security and privacy of the end-to-end encryption services. The separate storage of the encrypted content and the session keys for that encrypted content ensures that even if an attacker is able to gain unauthorized access to encrypted content store 103, the attacker will not have access to the session keys needed to decrypted the stored encrypted content.

Controller 101 may limit the amount of encrypted content that is stored in encrypted content store 103 for each encrypted session. The amount of encrypted content stored for an encrypted session may be limited based on an aggregate size threshold (e.g., store the latest encrypted content that collectively does not exceed 100 megabytes of data) or a time/date threshold (e.g., store the encrypted content that was exchanged over the last month).

The encrypted content stored for each encrypted session may be associated with or accessed using an identifier or other value that uniquely identifies the encrypted session. In other words, the encrypted content of a first encrypted session may be stored with a first identifier of the first encrypted session and the encrypted content of a second encrypted session may be stored with a second identifier of the second encrypted session.

History tracker 105 may include a repository that tracks the state of each encrypted session created, hosted, or managed by controller 101. The tracked state information may include the cryptographic session keys that are exchanged in those encrypted sessions and that are used to decrypt the encrypted content that is also exchanged in those encrypted sessions.

The state of an encrypted session changes when new session keys are exchanged between the authorized members of that encrypted session. New key exchanges may occur in response to the membership of the encrypted session changing as a result of a new member being added to the encrypted session, a member being removed, leaving, or disconnecting from the encrypted session, and/or periodic session key updates.

In some example embodiments, history tracker 105 may store a set of session keys exchanged during a particular state of a particular encrypted session with a first value or identifier that identifies the particular encrypted session and with a second value or identifier that identifies the particular state of the particular encrypted session. In some example embodiments, the second value or identifier may include an increasing numeric value with 0 corresponding to the initial state when the encrypted session was created.

Directory 107 may include a repository that stores the public cryptographic keys of each client device 111 that registers with end-to-end encrypted communication system 100. As part of registering for one or more services (e.g., encrypted chat, encrypted conferencing, encrypted messaging, etc.) of end-to-end encrypted communication system 100, client devices 111 may provide their public cryptographic keys. The public cryptographic keys may be used during the secure key exchanges for secure session key generation and/or secure session key transfer to authorized members of an encrypted session.

Invitations store 109 may include a repository that stores invitations or welcome messages for adding new members to an encrypted session when the new members being added are offline. In some example embodiments, the invitation messages may include or encode session state information or the encrypted content history. The stored invitation or welcome messages may be retained in invitations store 109 until the client device 111 of an added new member comes online and connects to end-to-end encrypted communication system 100.

Figure 2:
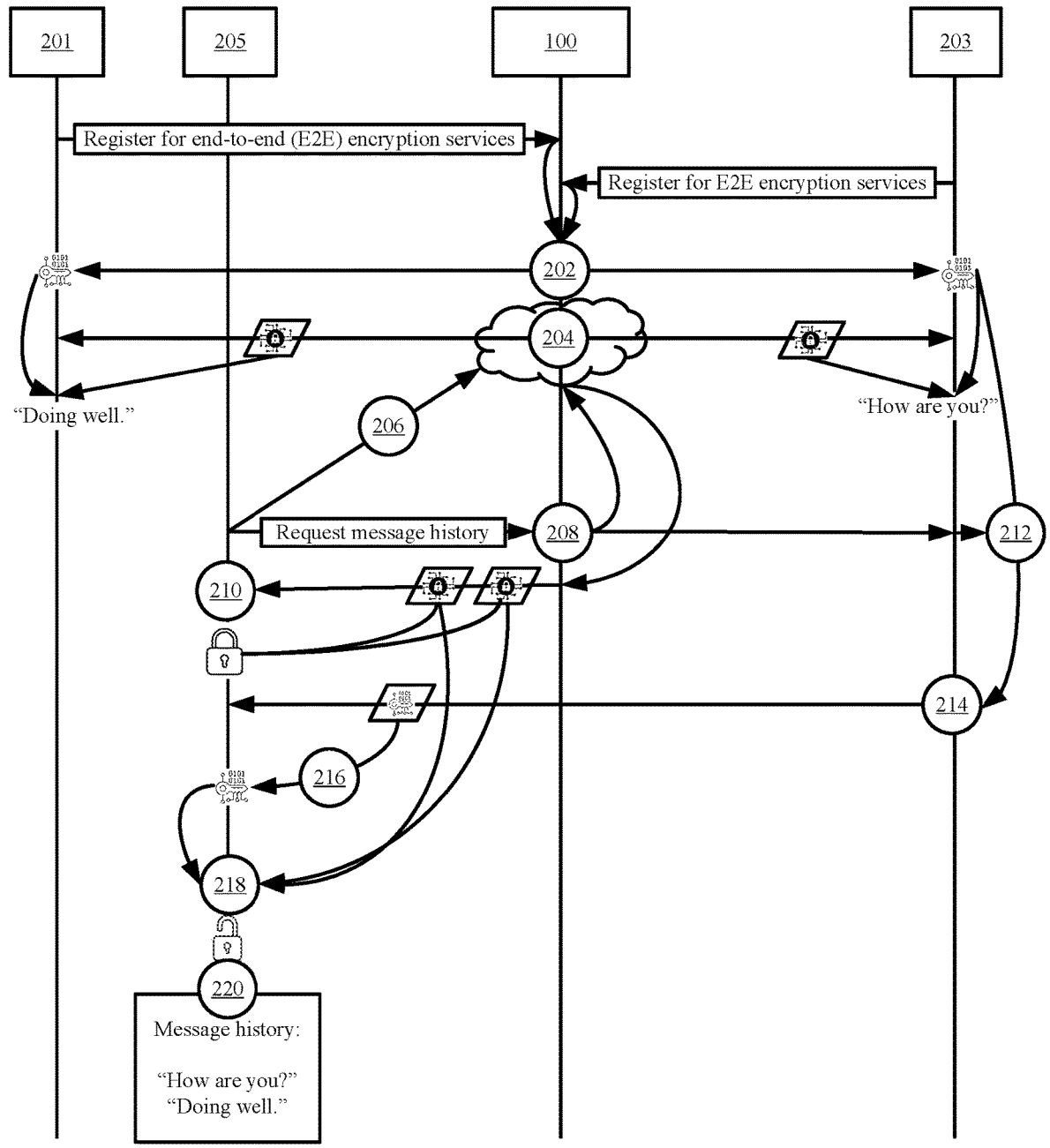
FIG. 2 illustrates an example of securely providing the metadata for decrypting previously exchanged encrypted content in an encrypted session in accordance with some embodiments presented herein.

FIG. 2 illustrates an example of securely providing the metadata for decrypting previously exchanged encrypted content in an encrypted session in accordance with some embodiments presented herein. First client device 201 and second client device 203 register with end-to-end encrypted communication system 100 and create (at 202) an encrypted session for secure communications. Creating (at 202) the encrypted session may include selecting first client device 201 and second client device 203 or their associated users as authorized members that may securely communicate over the encrypted session. As part of creating (at 202) the encrypted session, first client device 201 and second client device 203 may perform a symmetric or asymmetric cryptographic key exchange of an underlying end-to-end encryption protocol to establish the end-to-end encryption between first client device 201 and second client device 203.

First client device 201 and second client device 203 exchange (at 204) encrypted content using the created, exchanged, or negotiated session keys. For instance, first client device 201 and second client device 203 may encrypt content using an exchanged session key prior to transmitting the encrypted content to one another or other client devices of the encrypted session, may receive the encrypted content sent by other active client devices of the encrypted session, and may decrypt the encrypted content using the earlier exchanged session keys.

The session keys may be changed to maintain the security of the encrypted session. For instance, before each new content exchange, after some amount of time has passed, or whenever membership of the encrypted session changes (e.g., an active member goes offline, a member is added to the encrypted session, a member is removed from the encrypted session, an offline member rejoins the encrypted session, etc.) first client device 201, second client device 203, and other authorized members of the encrypted session may perform the key exchange to update or change the session keys that are used to encrypt and decrypt content that is subsequently exchanged in that encrypted session.

After first client device 201 and second client device 203 have exchanged (at 204) a set of encrypted content, third client device 205 joins (at 206) the encrypted session. Third client device 205 joins (at 206) the encrypted session as a result of being invited as a new member of the encrypted session by an existing member of the encrypted session (e.g., first client device 201 or second client device 203), or may have previously joined or participated in the encrypted session and is reconnecting to the encrypted session after being offline or disconnected from the encrypted session while first client device 201 and second client device 203 exchanged (at 204) the encrypted content.

Third client device 205 requests (at 208) the content history for the encrypted session. In some example embodiments, third client device 205 sends a state synchronization request to end-to-end encrypted communication system 100. The state synchronization request may specify the last state of the encrypted session that third client device 205 received or may indicate that third client device 205 is a new member with no prior encrypted session state. In some example embodiments, client device 205 requests (at 208) the content history via a custom message that is added to or implemented using existing encryption protocol message types.

Third client device 205 receives (at 210) the encrypted content that was exchanged (at 204) between first client device 201 and second client device 203 while third client device 205 was offline and/or disconnected from the encrypted session. In some example embodiments, third client device 205 receives (at 210) the encrypted content from one of first client device 201 or second client device 203 that remain connected to the encrypted session when third client device 205 requests (at 208) the content history. In some example embodiments, third client device 205 receives (at 210) the encrypted content from encrypted content store 103 of end-to-end encrypted communication system 100 in response to other authorized members of the encrypted session (e.g., first client device 201 and second client device 203) being offline or disconnected from the encrypted session when third client device 205 requests (at 208) the content history. Third client device 205 is unable to decrypt the received (at 210) encrypted content because the session keys needed for the decryption were exchanged prior to third client device 205 joining the encrypted session and because third client device 205 was not involved in the key exchange.

End-to-end encrypted communication system 100 may forward the content history request or the state synchronization request to other active or connected members of the encrypted session (e.g., first client device 201 and second client device 203). One or more of first client device 201 or second client device 203 may encode (at 212) the previously exchanged session keys for decrypting the encrypted content into a recovery message. Although the session keys are secure, second client device 203 may add an additional layer of security to the recovery message by encrypting the recovery message or the session keys in the recovery message using a public cryptographic key of third client device 205 that is stored in directory 107 or session keys that third client device 205 exchanges with first client device 201 and second client device 203 upon joining (at 206) the encrypted session. Second client device 203 sends (at 214) the recovery message to third client device 205. In some example embodiments, including embodiments in which no other members are online or connected to the encrypted session when third client device 205 joins (at 206) the encrypted session, the recovery message may be generated and sent using session keys of the encrypted session that are stored in history tracker 105. In some such example embodiments, third client device 205 is able to receive the recovery message without other members of the encrypted session being connected to the encrypted session at the same time as third client device 205.

Third client device 205 extracts (at 216) the previously exchanged session keys for the encrypted content that was exchanged in the encrypted session prior to third client device 205 joining (at 206) the encrypted session. In some example embodiments, the previously exchanged session keys are decrypted from the recovery message using cryptographic keys that third client device 205 exchanged upon joining (at 206) the encrypted session or a private cryptographic key for the public cryptographic key of third client device 205 that is stored in directory 107 at an earlier time when third client device 205 registered with end-to-end encrypted communication system 100.

Third client device 205 performs (at 218) an immutable decryption of the encrypted content using the previously exchanged session keys that were extracted (at 216) from the recovery message. Third client device 205 updates (at 220) the encrypted session history with the content that is decrypted from the encrypted content. The user associated with third client device 205 may now read or have access to the messages, files, videos, audio, and/or other content that was securely exchanged by first client device 201 and second client device 203 in the encrypted session prior to third client device 205 joining (at 206) the encrypted session. In this manner, end-to-end encrypted communication system 100 facilitates a secure distribution of the encrypted session history and the session keys for encrypting/decrypting the content history so that the content and session keys cannot be intercepted or accessed by unauthorized members or by network nodes that may be in the network path between the authorized members of the encrypted session or that improperly access the data packets associated with the encrypted session.

Figure 3:
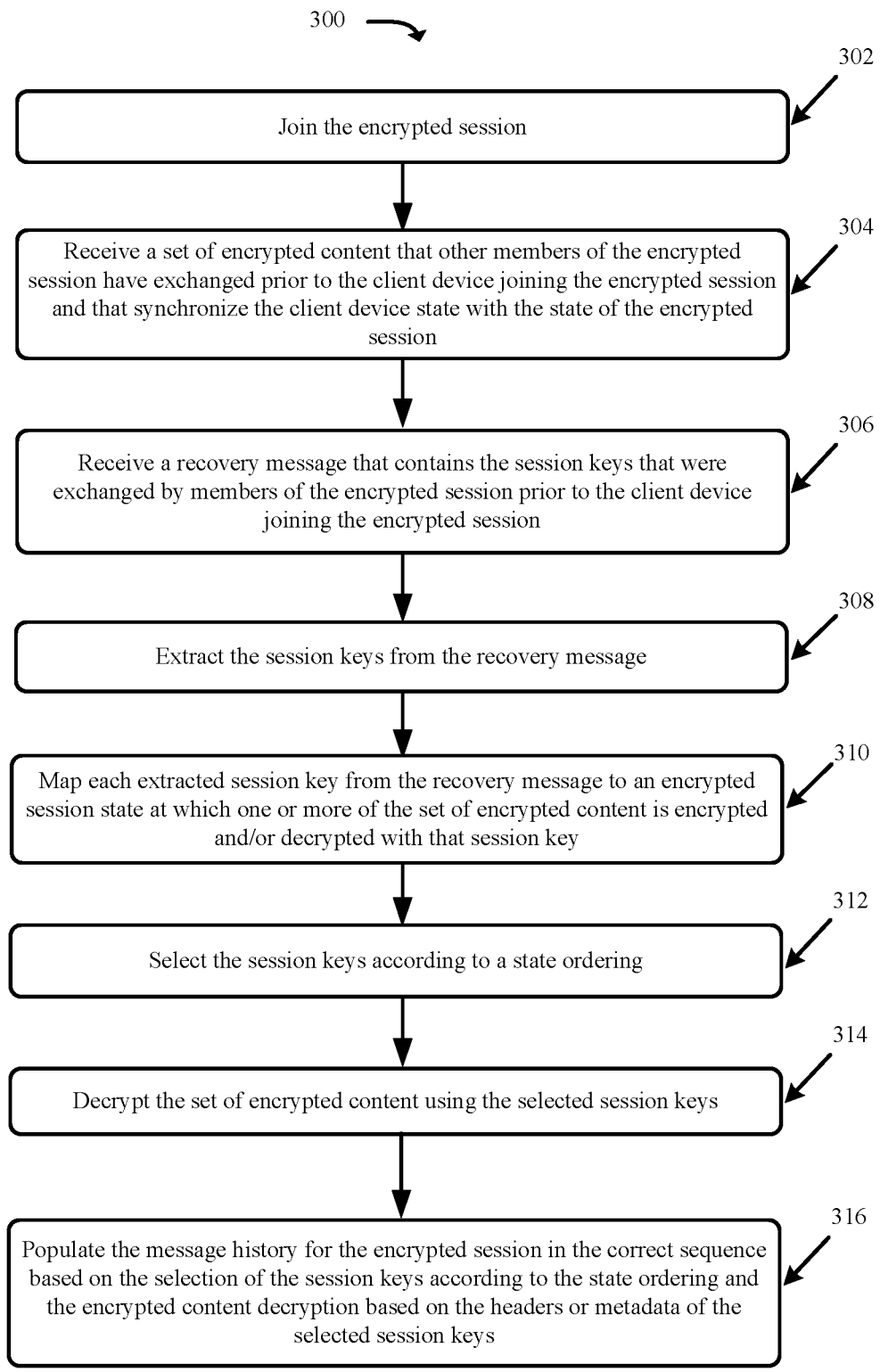
FIG. 3 presents a process for securely receiving the session keys for decrypting the content history of an encrypted session in accordance with some embodiments presented herein.

FIG. 3 presents a process 300 for securely receiving the session keys for decrypting the content history of an encrypted session in accordance with some embodiments presented herein. Process 300 is implemented by a client device that joins an encrypted session after a set of encrypted content has already been exchanged between other client devices of the encrypted session.

Process 300 includes joining (at 302) the encrypted session. Joining (at 302) the encrypted session may include providing an identifier for the encrypted session that the client devices seeks to join and authentication credentials, tokens, or other identifiers to verify that the client device is authorized to connect and participate in the encrypted session. As part of joining (at 302) the encrypted session, the client device may issue a content history request to end-to-end encrypted communication system 100. The content history request may identify the last state of the encrypted session that the client device received before joining (at 302) the encrypted session. If the client device is joining (at 302) the encrypted session as a new member, then no state or a null value for the state may be indicated in the content history request.

Process 300 includes receiving (at 304) a set of encrypted content that other members of the encrypted session have exchanged prior to the client device joining (at 302) the encrypted session and that synchronize the client device state with the state of the encrypted session. For instance, the set of encrypted content may include all communication messages that were exchanged between the last state when the client device was connected to the encrypted session and the current state of the encrypted session. In some example embodiments, controller 101 may track the last state for each client device in each encrypted session. If the encrypted session has been ongoing for a long period of time or involves a large exchange of data, then the set of encrypted content may be restricted to content that was exchanged over a specific duration (e.g., the last week) or the last set of content that does not exceed a cumulative amount of data (e.g., less than 1 gigabyte).

Process 300 includes receiving (at 306) a recovery message containing the session keys that were exchanged by members of the encrypted session prior to the client device joining (at 302) the encrypted session and that provide the cipher for decrypting the set of encrypted content. The recovery message may be transmitted contemporaneously or simultaneously with the set of encrypted content. The recovery message may be encrypted using cryptographic keys that the client device exchanged with other members of the encrypted session upon joining (at 302) the encrypted session or when registering with end-to-end encrypted communication system 100 for the end-to-end encryption services. For instance, end-to-end encrypted communication system 100 may store a public key for a private key that the client device never shares. Accordingly, any messages, including the recovery message, that are encrypted using the shared public key of the client device may only be decrypted using the private key of the client device that is not shared with any other devices.

Process 300 includes extracting (at 308) the previously exchanged session keys of the encrypted session from the recovery message. The client device performs an immutable decryption of the encrypted content based on the metadata or headers of the extracted (at 308) session keys. Specifically, process 300 includes mapping (at 310) each extracted (at 308) session key to an encrypted session state at which one or more content from the set of encrypted content is encrypted and/or decrypted with that session key. The mapping (at 310) is based on values or identifiers in the session key header or metadata. For instance, each session key may include a first value that indicates the state of the encrypted session during which that session key was used for encryption and/or decryption, and one or more second values that correspond to indices, hashes, or other identifiers for identifying the encrypted content and the order with which the encrypted content was exchanged during the state identified with the first value.

Process 300 includes selecting (at 312) session keys according to a state ordering, and decrypting (at 314) the set of encrypted content using the selected (at 312) session keys. For instance, the client device first selects (at 312) the session key that corresponds to the oldest encrypted session state, inspects the header or metadata of the selected session key to identify the indices, hashes, or other identifiers for the one or more encrypted content associated with the selected session key, and decrypts (at 314) the one or more encrypted content using the selected session key. The client device next selects (at 312) the session key that corresponds to the next oldest encrypted session state, decrypts (at 314) the encrypted content associated with the next selected (at 312) session key, and continues in this manner until arriving at the current state of the encrypted session. This results in an immutable decryption because the encrypted content may be stored and/or transmitted in any order and the session keys may be stored or encrypted in any order in the recovery message. The client device reconstructs the correct order for the encrypted session state based on the headers or metadata of the session keys.

Process 300 includes populating (at 316) the encrypted session history in the correct sequence based on the selection (at 312) of the session keys according to the state ordering and the encrypted content decryption (at 314) based on the headers or metadata of the selected (at 312) session keys. The decrypted content may appear in a user interface, application, window, or other visualization in which the past and current content for the encrypted session are presented. The decrypted content may include plain or unscrambled text as well as images, videos, audio, multimedia content, and other data that is not obfuscated and/or is in a human-readable or machine-readable format.

End-to-end encrypted communication system 100 may adjust the secure history recovery depending on encrypted session member connectivity and/or state. For instance, end-to-end encrypted communication system 100 may perform a first secure history recovery for a new member that is joining an encrypted session for a first time, and a second secure history recovery for a member that temporarily goes offline or disconnects from the encrypted session and reconnects to the encrypted session after some period of time. Similarly, end-to-end encrypted communication system 100 may perform a third secure history recovery when a member joins the encrypted session and requests the content history while other members of the encrypted session are online, connected, and/or actively participating in the encrypted session, and a fourth secure history recovery when a member joins the encrypted session and requests the content history and no other members of the encrypted session are online, connected, and/or actively participating in the encrypted session.

Figure 4:
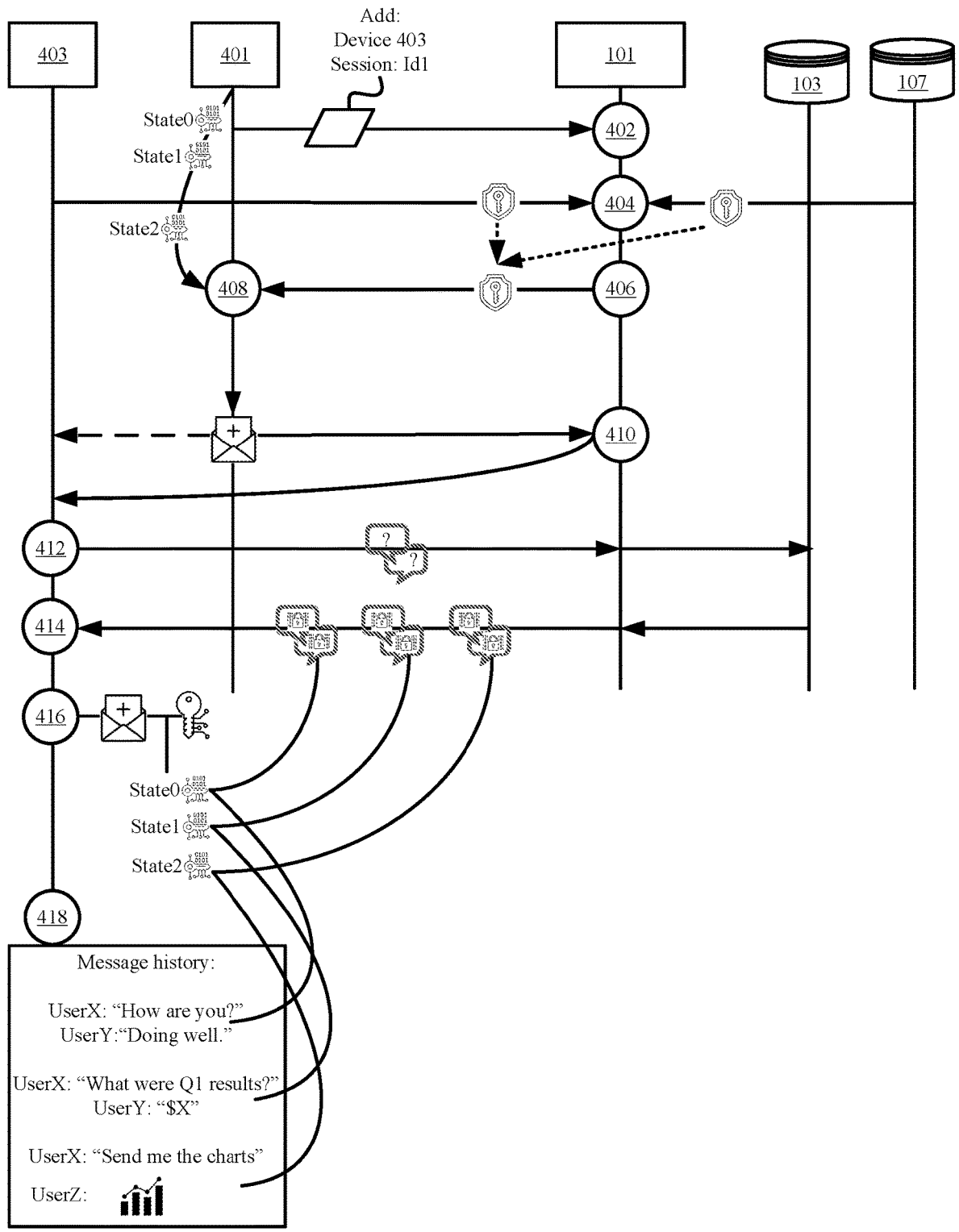
FIG. 4 illustrates an example of performing the secure history recovery for a member that is online at the time the member is added to an encrypted session in accordance with some embodiments presented herein.

FIG. 4 illustrates an example of performing the secure history recovery for a member that is online at the time the member is added to an encrypted session in accordance with some embodiments presented herein. First client device 401 is an authorized member of the encrypted session and issues (at 402) a request to add second client device 403 as another authorized member of the encrypted session. First client device 401 issues (at 402) the add request to controller 101. The add request is an invitation to allow second client device 403 access to the encrypted session and securely communicate with other authorized members of the encrypted session. Authorized members may join and/or participate in the encrypted session by sending and receiving secure/encrypted content to and from other authorized members.

The request to add second client device 403 may include an identifier that uniquely identifies second client device 403 or the member associated with second client device 403. For instance, second client device 403 may have previously registered with end-to-end encrypted communication system 100 and received a unique handle or username that identifies second client device 403 or the associated member across different encrypted sessions and/or different services offered by end-to-end encrypted communication system 100. The unique identifier may also include a telephone number, Internet Protocol (IP) address, unique device signature, user account that is accessed via secure login credentials, and/or other forms of uniquely identifying second client device 403 or the associated member.

The request to add second client device 403 may also include an identifier for the encrypted session that second client device 403 is granted access to. The encrypted session may be identified with a Uniform Resource Locator (URL), hyperlink, name, unique value, and/or identifiers that authorized members use to join the encrypted session.

Controller 101 receives (at 402) the add request. Controller 101 may verify the add request. Specifically, controller 101 may verify that the add request is issued (at 402) by an authorized member of the encrypted session (e.g., first client device 401) with authority or privileges to add and remove members to and from the identified encrypted session. Controller 101 may also verify that second client device 403 has registered with end-to-end encrypted communication system 100.

Controller 101 retrieves (at 404) a public cryptographic key of second client device 403. In some example embodiments, second client device 403 provides the public cryptographic key to end-to-end encrypted communication system 100 as part of registering with end-to-end encrypted communication system 100 and/or for the provided services. In some such example embodiments, end-to-end encrypted communication system 100 may store the public cryptographic key in association with a unique identifier for second client device 403 (e.g., handle, username, telephone number, etc.) in directory 107, and may retrieve (at 404) the public cryptographic key for second client device 403 from directory 107 using the unique identifier. In some other example embodiments, controller 101 may retrieve (at 404) the public cryptographic key directly from second client device 403 when second client device 403 is online at the time of the add request.

Controller 101 provides (at 406) the public cryptographic key of second client device 403 to first client device 401. Controller 101 may send the public cryptographic key in response to the add request and/or may send the public cryptographic key in an encrypted message so that other network nodes cannot intercept or use the public cryptographic key of second client device 403.

First client device 401 generates (at 408) a welcome message or invitation using the public cryptographic keys of second client device 403. Since second client device 403 is newly added to the encrypted session, second client device 403 will have no prior state or content history for the encrypted session. Accordingly, first client device 401 retrieves the session keys that were exchanged and used for the prior exchanged content of the encrypted session from a local storage or memory, and encrypts the session keys as part of the welcome message or invitation using the public cryptographic key of second client device 403.

First client device 401 sends (at 410) the welcome message or invitation with the retrieved session keys. In some example embodiments, the welcome message is a message of the MLS protocol that provides a new member to the encrypted session (e.g., second client device 403) with the information to initialize their state for the state or epoch in which they are added or in which they want to add themselves to the encrypted session. In some example embodiments, the welcome message or invitation provides second client device 403 with the session keys that are exchanged for the current state of the encrypted session and/or past states. Second client device 403 may use the welcome message data to synchronize state with the encrypted session, join the encrypted session, and/or send or receive encrypted content with other members of the encrypted session after joining the encrypted session. In some example embodiments, second client device 403 uses its private cryptographic key to decrypt the welcome message and extract the session keys for the prior encrypted content of the encrypted session.

In some example embodiments, first client device 401 sends (at 410) the welcome message or invitation directly to second client device 403. In some other example embodiments, first client device 401 sends (at 410) the welcome message or invitation to controller 101 and controller 101 forwards the welcome message or invitation to second client device 403.

Second client device 403 requests (at 412) the content history for the encrypted session upon joining the encrypted session. For instance, in response to receiving the welcome message or invitation, second client device 403 issues a join message to controller 101. The join message may identify the encrypted session that second client device 403 is attempting to join and may include a request to synchronize its state with the current state of the encrypted session. Since second client device 403 is a newly added to the encrypted session, its state will correspond to a null value or a value indicating that it has no prior state for the encrypted session.

Second client device 403 receives (at 414) the set of encrypted content that was exchanged in the encrypted session prior to second client device 403 joining the encrypted session and/or in response to the request (at 412) for the content history. In some example embodiments, controller 101 retrieves the set of encrypted content from first client device 401 that issued (at 402) the request to add second client device 403 to the encrypted session and that is online when controller 101 receives the content history request from second client device 403. In some other example embodiments, controller 101 retrieves the set of encrypted content from encrypted content store 103. Controller 101 forwards the retrieved set of encrypted content to second client device 403. In still some other example embodiments, first client device 401 may directly send the set of encrypted content to second client device 403.

Second client device 403 decrypts (at 416) the content history for the newly joined encrypted session by decrypting the set of encrypted content using the session keys included in the welcome message (e.g., the session keys that are extracted from the welcome message as a result of decrypting the welcome message with a private cryptographic key of second client device 403). Second client device 403 presents (at 418) the content that was exchanged prior to second client device 403 joining the encrypted session, and may send and receive encrypted content to and from other authorized members of the encrypted session.

Figure 5:
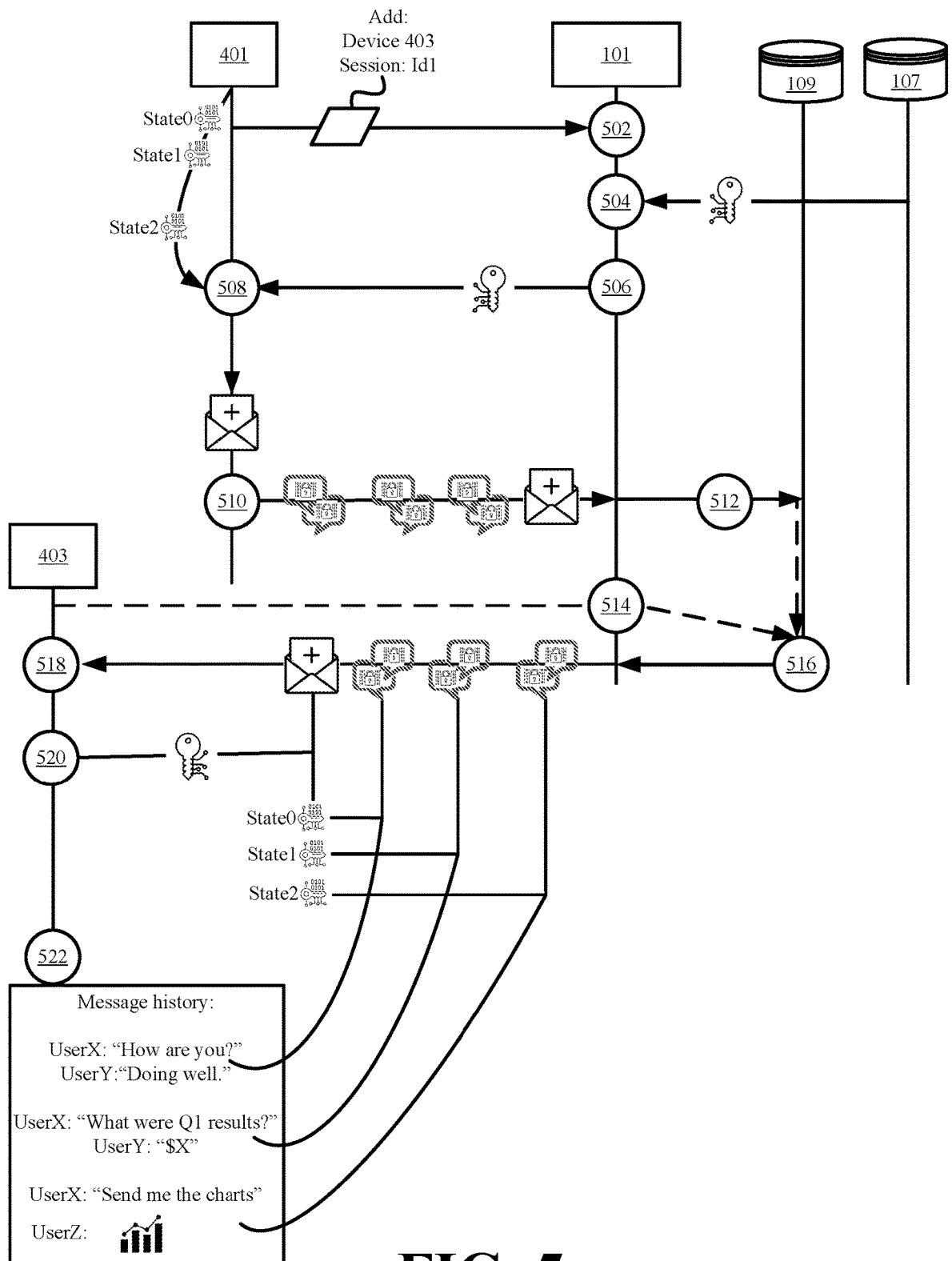
FIG. 5 illustrates an example of performing the secure history recovery for a member that is offline at the time the member is added to an encrypted session in accordance with some embodiments presented herein.

End-to-end encrypted communication system 100 also supports adding a new member to the encrypted session when that member is offline, and securely providing the content history for the encrypted session to the new member once the new member is online and joins the encrypted session. FIG. 5 illustrates an example of performing the secure history recovery for a member that is offline at the time the member is added to an encrypted session in accordance with some embodiments presented herein.

First client device 401 is an authorized member of the encrypted session and issues (at 502) a request to add second client device 403 as another authorized member of the encrypted session. In this figure, second client device 403 is offline at the time first client device 401 issues (at 502) the add request. First client device 401 issues (at 502) the add request to controller 101.

Controller 101 retrieves (at 504) the public cryptographic key of second client device 403. Since second client device 403 is offline, controller 101 retrieves (at 504) the public cryptographic key that second client device 403 provided when registering for end-to-end encrypted communication system 100 services and that are stored in directory 107.

Controller 101 provides (at 506) the public cryptographic key of second client device 403 to first client device 403, and first client device 401 uses the public cryptographic key of second client device 403 to generate (at 508) the invitation. Generating (at 508) the invitation includes obtaining the session keys that were exchanged and used for encrypting and decrypting the prior exchanged content of the encrypted session, and encrypting the exchanged session keys with other session initialization information in the invitation using the public cryptographic key of second client device 403.

First client device 401 sends (at 510) the invitation with the encrypted content of the encrypted session to controller 101. In some example embodiments, first client device 401 encrypts the encrypted content with the session keys when generating (at 508) the invitation. In some other embodiments, first client device 401 sends (at 510) the invitation and the encrypted content separately since the encrypted content are already securely obfuscated and there is no need to add another layer of encryption to the already encrypted content.

Controller 101 determines that second client device 403 is offline. Controller 101 may track users and/or client devices that have logged in or accessed the end-to-end encrypted communication system 100 services, and may determine that second client device 403 is offline based on the tracking. Alternatively, controller 101 may ping second client device 403 to determine the status of second client device 403.

Controller 101 enters (at 512) the invitation for adding second client device 403 to the encrypted session to invitations store 109. The invitation is stored with the unique identifier that is associated with or assigned to second client device 403. In some example embodiments, controller 101 separately stores the invitation in invitations store 109 and the encrypted content in encrypted content store 103.

Controller 101 detects (at 514) when second client device 403 comes online and/or accesses end-to-end encrypted communication system 100 or services of end-to-end encrypted communication system 100. For instance, second client device 403 may provide login information to access end-to-end encrypted communication system 100 or may open an application that is used to access the end-to-end encrypted communication system 100 services.

In response to detecting (at 514) that second client device 403 is online, controller 101 searches invitations store 109 for any invitations that are stored in conjunction with the unique identifier of second client device 403, and retrieves (at 516) the invitation that was generated by first client device 401 for adding second client device 403 to the encrypted session from invitations store 109. Controller 101 also retrieves (at 516) the encrypted content from invitations store 109 or encrypted content store 103.

Controller 101 forwards (at 518) the invitation, that contains the session keys for the encrypted session history, and the encrypted content to second client device 403. Second client device 403 may decrypt the invitation using its private cryptographic key and extract the session keys for decrypting the encrypted content. Second client device 403 decrypts (at 520) the encrypted content using the session keys that are extracted from the decrypted invitation. The decrypted encrypted session history may then be presented (at 522) in a user interface or application of second client device 403.

The encrypted session history that is sent to second client device 403 may be out-of-sync with the current state of the encrypted session due to a delay between first client device 401 generating the invitation and second client device 403 retrieving the invitation. Additional encrypted content may be generated and exchanged by members of the encrypted session during the delay with the updated session keys for that additional encrypted content not being included in the invitation. Accordingly, second client device 403 may synchronize its encrypted session history state with the current state of the encrypted session by requesting any missed content history for the encrypted session upon joining the encrypted session.

Figure 6:
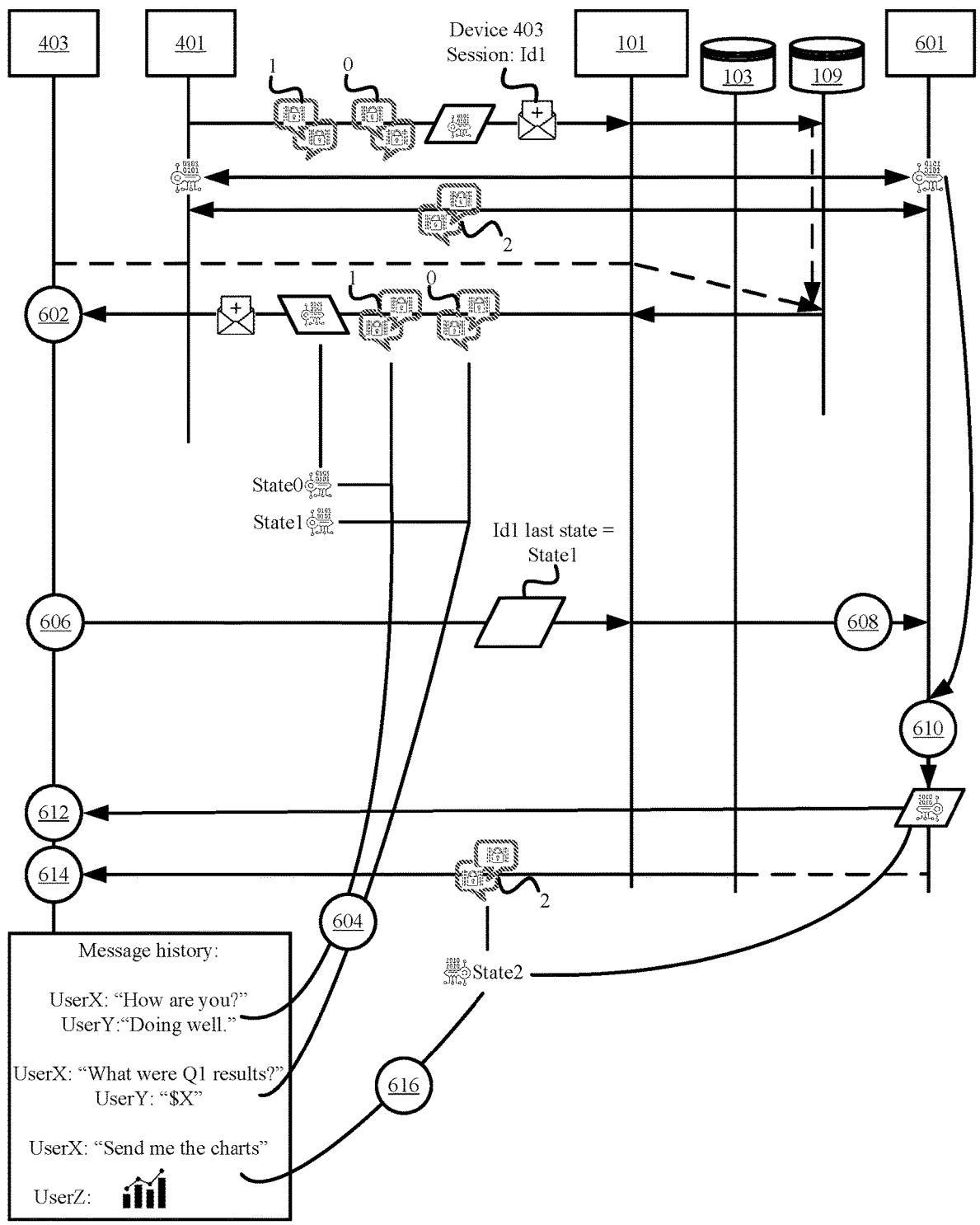
FIG. 6 illustrates an example of a newly added member synchronizing its content history with the current state of an encrypted session that the member joins in accordance with some embodiments presented herein.

FIG. 6 illustrates an example of a newly added member synchronizing its content history with the current state of an encrypted session that the member joins in accordance with some embodiments presented herein. Second client device 403 comes online, receives (at 602) a welcome message or an invitation to join the encrypted session, a previously generated recovery message that is part of the invitation or stored separately in invitations store 109, and the encrypted content for a last state of the encrypted session at the time the invitation and/or recovery message was generated. In some example embodiments, end-to-end encrypted communication system 100 provides the invitation for adding the new member to the encrypted session without any content history when the new member is offline at the time the request to add the new member is initiated by another member of the encrypted session.

Second client device 403 decrypts (at 604) the last state of the encrypted session that was spanned by the invitation and/or recovery message. Decrypting (at 604) the last state of the encrypted session includes using the session keys included with the invitation and/or received recovery message to decrypt encrypted content that was previously exchanged and encrypted in the encrypted session using those session keys. However, as noted above, the encrypted session state associated with the invitation may be out-of-sync with the current state of the encrypted session because additional session keys and content were exchanged in the encrypted session between the time the invitation was generated and the time that second client device 403 came online and accessed the invitation.

Second client device 403 joins the encrypted session that is identified in the invitation, and issues (at 606) a state synchronization request to synchronize the content history state of the encrypted session at second client device 403 with the current state of the encrypted session. The state synchronization request may include a first identifier that identifies the encrypted session for which the content history is sought and a second identifier that identifies the last state of the encrypted session that is locally present on second client device 403. If second client device 403 is added to and/or joins the encrypted session without receiving any previously exchanged session keys and associated encrypted content, then the second identifier may be a null value or a value that identifies that no state information has been received. If second client device 403 receives some of the previously exchanged session keys and associated encrypted messages with the invitation and/or prior to joining the encrypted session, then the second identifier may correspond to a value for the last state of the encrypted session that was included in the invitation, received session keys, and/or encrypted content associated with the received session keys.

Controller 101 receives (at 606) the state synchronization request from second client device 403 and forwards (at 608) the state synchronization request to any client devices that are connected to the encrypted session identified by the first identifier or to any members of the encrypted session that are online and/or actively participating in the encrypted session. As shown in FIG. 6, third connected client 601 receives (at 608) the forwarded state synchronization request.

Third connected client 601 generates (at 610) a recovery message based on the last state of the encrypted session identified in the state synchronization request. The recovery message includes the session keys for the encrypted content that was exchanged in the encrypted session between the last state of the encrypted session identified in the state synchronization request (e.g., the second identifier) and the current state of the encrypted session.

Third connected client 601 transfers (at 612) the recovery message to second client device 403. Other connected clients of the encrypted session (e.g., first client device 401) may also generate and send the same recovery message. Second client device 403 may discard all but one of the received recovery messages.

Second client device 403 also receives (at 614) the encrypted content that are associated with the session keys in the recovery message. Second client device 403 may receive (at 614) the encrypted content from encrypted content store 103 or from other connected clients (e.g., third connected client 601).

Second client device 403 updates (at 616) its message history by extracting the keys of the encrypted session that were exchanged after the invitation was generated from the transferred (at 612) recovery message, and by using the extracted keys to decrypt the encrypted content that was exchanged after the invitation was generated. By updating (at 616) its message history, second client device 403 synchronizes its state with the current state of the encrypted session and will have securely received the content that was exchanged by the other members of the encrypted session after the invitation was generated.

End-to-end encrypted communication system 100 may perform a similar encrypted session history recovery for client devices that temporarily disconnect from an encrypted session and reconnect at a later time. The encrypted session history recovery may be adapted to securely provide the reconnecting client devices with the session keys and the encrypted content for the state changes that occurred to the encrypted session while the reconnecting client device was offline or disconnected from the encrypted session.

Figure 7:
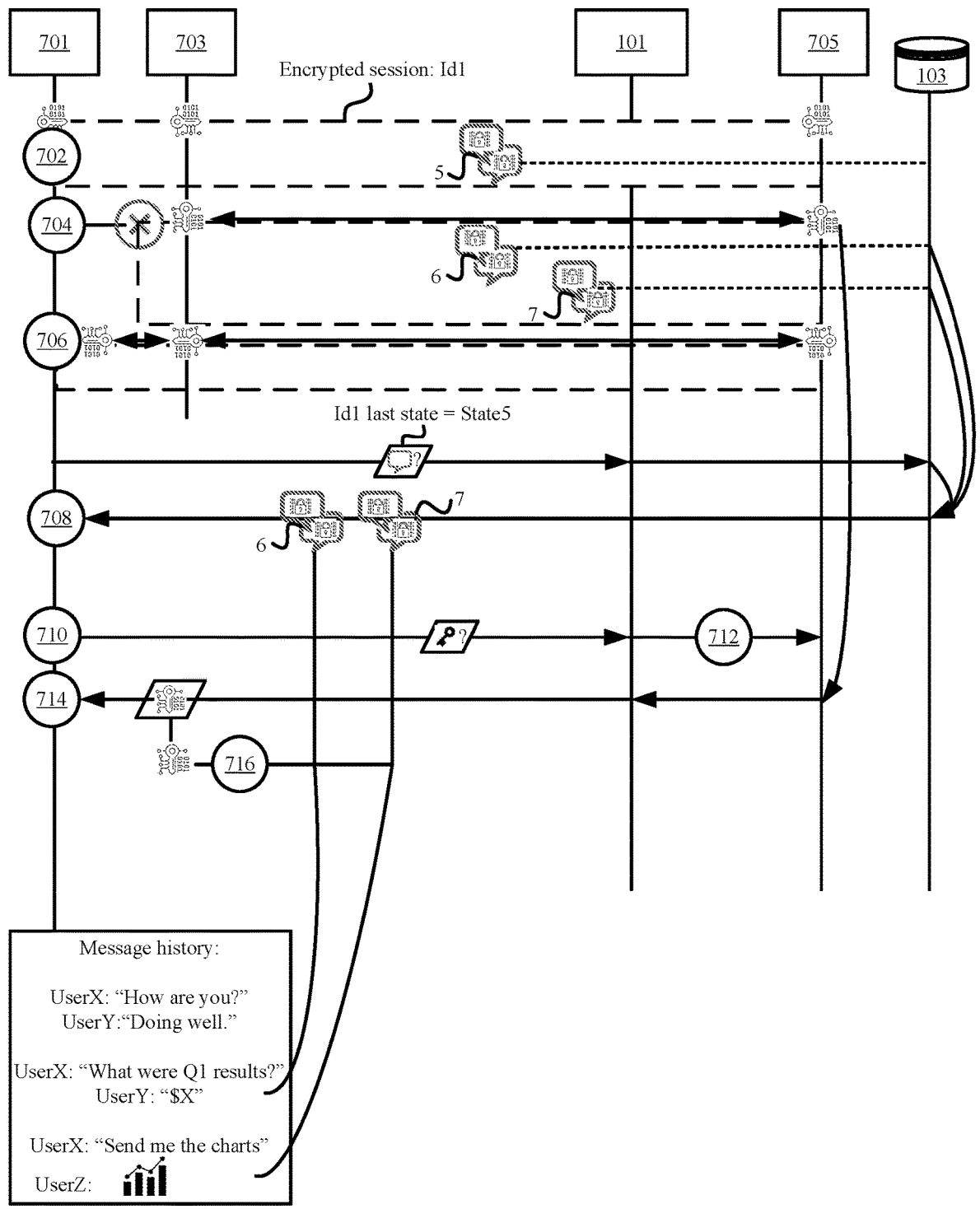
FIG. 7 illustrates an example of securely providing the session keys and content history for a client device that reconnects to an encrypted session in accordance with some embodiments presented herein.

FIG. 7 illustrates an example of securely providing the session keys and content history for a client device that reconnects to an encrypted session in accordance with some embodiments presented herein. First client device 701 joins (at 702) an encrypted session with second client device 703 and third client device 705, and exchanges encrypted content for a first period of time. First client device 701 disconnects (at 704) from the encrypted session or goes offline for a second period of time during which second client device 703 and third client device 705 continue exchanging encrypted content. First client device 701 reconnects (at 706) or joins the encrypted session at a third time after having been offline or disconnected from that encrypted session for the second period of time.

First client device 701 retrieves (at 708) the encrypted content that was exchanged by other devices or members of the encrypted session during the period of time that first client device 701 was offline or disconnected from the encrypted session. First client device 701 retrieves (at 708) the encrypted content from encrypted content store 103. In some example embodiments, first client device 701 issues a request to encrypted content store 103 with a first value that identifies the encrypted session and a second value that identifies the last state or last content that first client device 701 received for the identified encrypted session. In some other example embodiments, first client device 701 retrieves (at 708) all stored encrypted content for the encrypted session from encrypted content store 103 and compares hashes or other identifiers of the retrieved encrypted content against hashes or other identifiers of the encrypted content in the content history or local storage of first client device 701 to determine the last state of the encrypted session that first client device 701 received when last connected to the encrypted session.

First client device 701 is unable to decrypt the retrieved (at 708) set of encrypted content or a subset of the retrieved (at 708) set of encrypted content because first client device 701 was offline when the session keys associated with that encrypted content were exchanged. Accordingly, first client device 701 requests (at 710) the cryptographic history (e.g., session keys) for the encrypted content that could not be decrypted by first client device 701 from controller 101.

In some example embodiments, controller 101 tracks the cryptographic metadata and/or the session keys that each client device exchanges for each encrypted session. In other words, the cryptographic metadata that reaches controller 101 or that is exchanged for each encrypted session hosted by controller 101 is monitored on a per client device and per encrypted session basis. In some such example embodiments, controller 101 checks the tracked cryptographic metadata for first client device 701 and the encrypted session to determine the last state or last cryptographic metadata that first client device 701 received and/or exchanged when last connected to the encrypted session. In some other example embodiments, first client device 701 identifies a last received state for the content history of the encrypted session with the request for the cryptographic history.

Controller 101 forwards (at 712) the cryptographic history request from first client device 701 to other client devices of the same encrypted session that are online or connected to the encrypted session. Controller 101 may update the cryptographic history request to identify the last state of the encrypted session that first client device 701 received or the session keys that were exchanged in the encrypted session after first client device 701 went offline or disconnected from the encrypted session.

First client device 701 receives (at 714) a recovery message containing the missing cryptographic history and/or session keys from third client device 705. In some example embodiments, other connected devices may directly send the recovery message to first client device 701. In some other example embodiments, the other connected devices send the recovery message to controller 101 and controller 101 forwards the recovery message to first client device 701.

First client device 701 decrypts (at 716) the retrieved (at 708) set of encrypted content using the session keys that are contained in the recovery message. The content history presented by first client device 701 is complete and is synchronized with the current state of the encrypted session such that the reconnecting member is able to see all content that was exchanged during the time first client device 701 was disconnected from the encrypted session.

Figure 8:
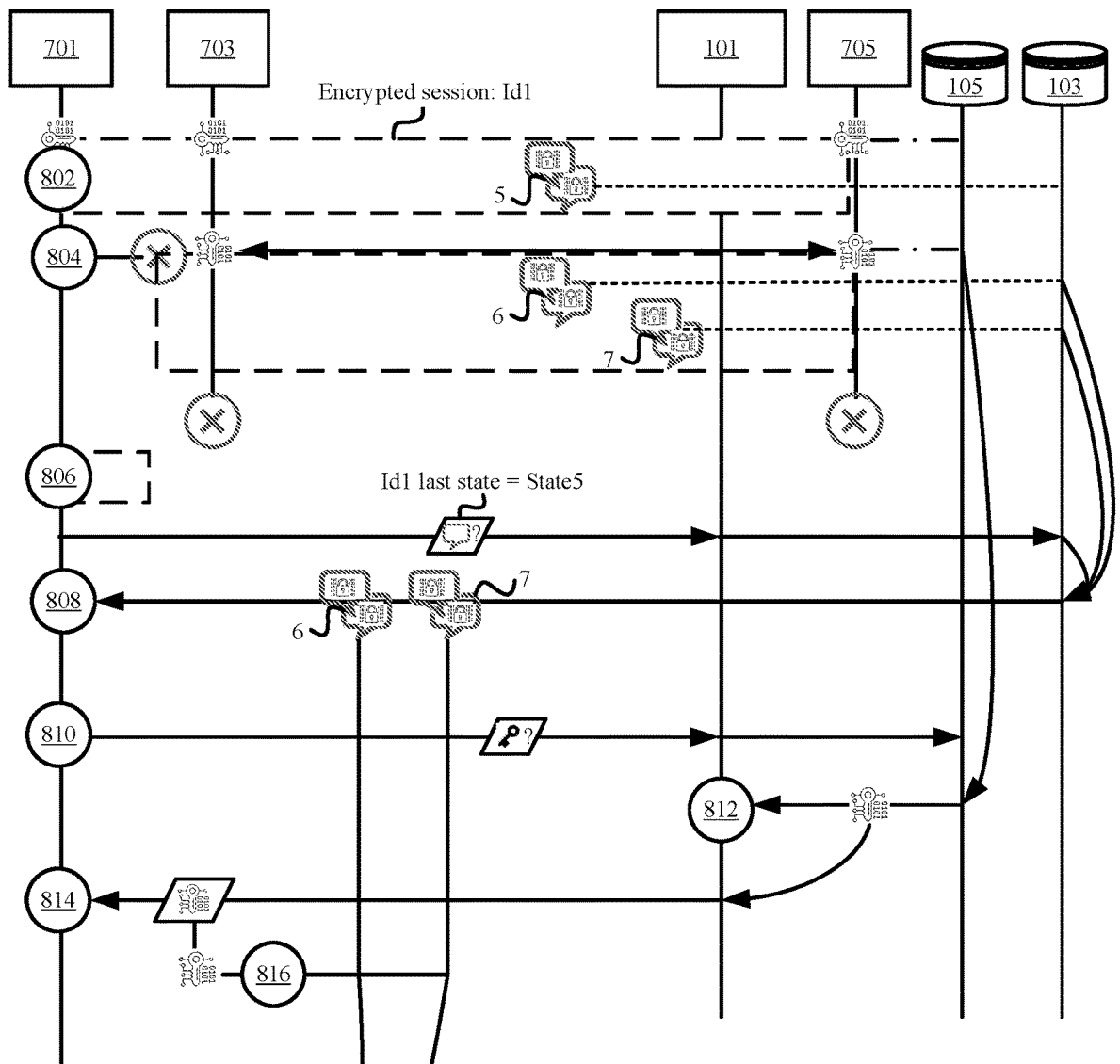
FIG. 8 illustrates an example of securely providing the encrypted session history for a client device that reconnects to an encrypted session at a time that other members or client devices of the encrypted session are offline in accordance with some embodiments presented herein.

End-to-end encrypted communication system 100 may also securely provide the encrypted session history to a reconnecting client device when no other members or client devices are connected to the encrypted session. FIG. 8 illustrates an example of securely providing the encrypted session history for a client device that reconnects to an encrypted session at a time that other members or client devices of the encrypted session are offline in accordance with some embodiments presented herein.

As in FIG. 7, first client device 701 joins (at 802) the encrypted session, disconnects (at 804) from the encrypted session or goes offline, and reconnects (at 806) or joins the encrypted session after having been offline or disconnected from that encrypted session for a period of time.

First client device 701 retrieves (at 808) the encrypted content that was exchanged during the period of time that first client device 701 was offline or disconnected from the encrypted session by accessing and/or querying encrypted content store 103. First client device 701 is unable to decrypt one or more of the retrieved (at 808) set of encrypted content, and therefore requests (at 810) the cryptographic history (e.g., session keys) for the encrypted content that could not be decrypted from controller 101.

Controller 101 may determine that no other members or client devices of the encrypted session are online, active, and/or connected to the encrypted session at the time first client device 701 reconnects (at 806) to the encrypted session. Since controller 101 is unable to perform a peer-to-peer retrieval of the cryptographic history, controller 101 may alternatively query and retrieve (at 812) the cryptographic history from history tracker 105. For instance, controller 101 may issue a cryptographic history request message to history tracker 105 with the identifier of the encrypted session and the identifier for the state of the encrypted session that first client device 701 received when last connected to the encrypted session.

In some example embodiments, controller 101 receives (at 812) the session keys that were exchanged in the encrypted session since the last state received by first client device 701 from history tracker 105. Controller 101 generates the recovery message to encode the received session keys, and controller 101 sends (at 814) the recovery message to first client device 701.

In some other example embodiments, history tracker 105 generates the recovery message with the session keys that were exchanged in the encrypted session since the last state received by first client device 701, history tracker 105 sends the recovery message to controller 101, and controller 101 forwards the recovery message to first client device 701.

In still some other example embodiments, controller 101 may detect that another member of the encrypted session is not connected to the encrypted session but is available or online. For instance, the other member may be connected to a different encrypted session or may be accessing a different encrypted service offered by end-to-end encrypted communication system 100. In some such example embodiments, controller 101 may notify the other member to reconnect or join the encrypted session in order to provide the missing session keys for synchronizing the encrypted session state of first client device 701. Alternatively, controller 101 may issue control messages to the other member that cause the other member to provide the missing session keys to controller 101 without the other member reconnecting or joining the encrypted session. Controller 101 may then generate the recovery message to send to first client device 701.

First client device 701 decrypts (at 816) the retrieved (at 808) set of encrypted content using the keys that are extract from the received recovery message. The content history stored and/or presented at first client device 701 contains all content exchanged in the encrypted session before and after first client device 701 disconnected (at 804) from the encrypted session. Accordingly, first client device 701 may participate in the encrypted session without losing any data or content that is exchanged when first client device 701 and other members of the encrypted session are offline.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The invention claimed is:

1. A computer-implemented method for synchronizing end-to-end encrypted content between offline and online members of an encrypted session, the computer-implemented method comprising:

receiving encrypted content from at least a first member of the encrypted session during a first time when the first member is online and a second member of the encrypted session is offline and not connected to the encrypted session;

detecting, at a second time that is after the first time, that the second member is online and is actively connected to the encrypted session;

providing the second member with a session key associated with decrypting the encrypted content in response to detecting that the second member is online at the second time, wherein the session key was exchanged in the encrypted session at the first time before the second member is connected to the encrypted session; and
providing the second member the encrypted content that was received during the first time when the second member was offline.

2. The computer-implemented method of claim 1, wherein providing the session key comprises:
retrieving a public key of the second member that is associated with a private key of the second member that is not shared;
generating an invitation by encrypting the session key using the public key of the second member; and
sending the invitation in place of the session key to the second member.

3. The computer-implemented method of claim 1, further comprising:
exchanging a first session key between the first member and a third member prior to receiving the encrypted content, wherein the first session key is the session key; and
updating session keys of the encrypted session in response to detecting that the second member is actively connected to the encrypted session at the second time, wherein updating the session keys comprises exchanging a second session key between the second member and at least one other active member of the encrypted session.

4. The computer-implemented method of claim 3, further comprising:
securing content that is exchanged in the encrypted session during the first time before the second member is connected to the encrypted session using the first session key; and
securing content that is exchanged in the encrypted session during the second time after the second member is connected to the encrypted session using the second session key.

5. The computer-implemented method of claim 1, further comprising:
populating a history of the encrypted session for the second member with decrypted contents of the encrypted content that was exchanged prior to the second member connecting to the encrypted session by decrypting the encrypted content using the session key.

6. The computer-implemented method of claim 1, further comprising:
updating session keys of the encrypted session in response to the second member connecting to the encrypted session; and
securely exchanging encrypted content between the second member and one or more other connected members of the encrypted session using a second session key that results from updating the session keys while recovering a history of content exchanged before the second member connected to the encrypted session by decrypting the encrypted content using the session key.

7. The computer-implemented method of claim 1, further comprising:
receiving a request to add the second member to the encrypted session at the first time;
determining that the second member is offline and not connected to the encrypted session at the first time associated with the request to add the second member;
generating an invitation that encrypts the session key;
storing the invitation in a repository; and
distributing the invitation from the repository to the second member in response to the second member coming online at the second time.

8. The computer-implemented method of claim 7, wherein generating the invitation comprises:
retrieving a public key that is shared by the second member during a registration that occurs prior to the first time; and
encrypting the session key in the invitation using the public key.

9. The computer-implemented method of claim 1, wherein providing the second member with the session key comprises:
receiving a recovery message comprising the session key and one or more other session keys for the encrypted session from the first member; and
distributing the recovery message to the second member in response to detecting that the second member is online and connected to the encrypted session.

10. The computer-implemented method of claim 1, further comprising:
determining that a third member is connected to the encrypted session at the second time and that the first member is disconnected from the encrypted session at the second time; and
wherein providing the session key comprises:
distributing a message with the session key and one or more other session keys for the encrypted session from the third member to the second member.

11. The computer-implemented method of claim 1, wherein providing the encrypted content comprises:
distributing the encrypted content from a first source in an end-to-end encrypted communication system that is different than a second source of the end-to-end encrypted communication system providing the session key to the second member.

12. The computer-implemented method of claim 1, further comprising:
receiving second encrypted content during a third time that is before the first time;
receiving a state synchronization request from the second member with an identifier that identifies a last state of the encrypted session received by the second member;
determining that the encrypted content and the session key were exchanged after the last state and that the second encrypted content was exchanged on or before the last state; and
withholding the second encrypted content from a message history recovery of the second member.

13. The computer-implemented method of claim 1, further comprising:
tracking a last state of the encrypted session at which the second member disconnects from the encrypted session;
determining that the second member reconnects to the encrypted session at the second time corresponding to a current state of the encrypted session; and
wherein providing the encrypted content comprises:
determining that the encrypted content was exchanged after the last state tracked for the second member and before the current state of the encrypted session.

14. A system for providing end-to-end encryption services, the system comprising:
a controller with one or more hardware processors configured to:
receive encrypted content from at least a first member of the encrypted session during a first time when the first member is online and a second member of the encrypted session is offline and not connected to the encrypted session;

detect, at a second time that is after the first time, that the second member is online and is actively connected to the encrypted session;

provide the second member with a session key associated with decrypting the encrypted content in response to detecting that the second member is online at the second time, wherein the session key was exchanged in the encrypted session at the first time before the second member is connected to the encrypted session; and provide to the second member the encrypted content that was received during the first time when the second member was offline.

15. The system of claim 14, wherein providing the session key comprises:

retrieving a public key of the second member that is associated with a private key of the second member that is not shared;

generating an invitation by encrypting the session key using the public key of the second member; and sending the invitation in place of the session key to the second member.

16. The system of claim 14, wherein the one or more hardware processors are further configured to:

exchange a first session key between the first member and a third member prior to receiving the encrypted content, wherein the first session key is the session key; and update session keys of the encrypted session in response to detecting that the second member is actively connected to the encrypted session at the second time, wherein updating the session keys comprises exchanging a second session key between the second member and at least one other active member of the encrypted session.

17. The system of claim 16, wherein the one or more hardware processors are further configured to:

secure content that is exchanged in the encrypted session during the first time before the second member is connected to the encrypted session using the first session key; and secure content that is exchanged in the encrypted session during the second time after the second member is connected to the encrypted session using the second session key.

18. The system of claim 14, wherein the one or more hardware processors are further configured to:

populate a history of the encrypted session for the second member with decrypted contents of the encrypted content that was exchanged prior to the second member connecting to the encrypted session by decrypting the encrypted content using the session key.

19. The system of claim 14, wherein the one or more hardware processors are further configured to:

update session keys of the encrypted session in response to the second member connecting to the encrypted session; and securely exchange encrypted content between the second member and one or more other connected members of the encrypted session using a second session key that results from updating the session keys while recovering a history of content exchanged before the second member connected to the encrypted session by decrypting the encrypted content using the session key.

20. A non-transitory computer-readable medium storing program instructions that, when executed by one or more hardware processors of an end-to-end encrypted communication system, cause the end-to-end encrypted communication system to perform operations comprising:

receiving encrypted content from at least a first member of the encrypted session during a first time when the first member is online and a second member of the encrypted session is offline and not connected to the encrypted session;

detecting, at a second time that is after the first time, that the second member is online and is actively connected to the encrypted session;

providing the second member with a session key associated with decrypting the encrypted content in response to detecting that the second member is online at the second time, wherein the session key was exchanged in the encrypted session at the first time before the second member is connected to the encrypted session; and providing the second member the encrypted content that was received during the first time when the second member was offline.

* * * * *